United States Patent [19]

Band et al.

[11] Patent Number: 4,794,212

[45] Date of Patent: Dec. 27, 1988

[54] PROTECTIVE DEVICE FOR A FEED UNIT

[75] Inventors: Gerhard Band, Oberndorf; Bernd Muller, Herrenzimmern, both of Fed. Rep. of Germany

[73] Assignee: Mauser-Werke Oberndorf GmbH, Oberndorf, Fed. Rep. of Germany

[21] Appl. No.: 137,749

[22] Filed: Dec. 24, 1987

[30] Foreign Application Priority Data

Jan. 16, 1987 [DE] Fed. Rep. of Germany ....... 3701125

[51] Int. Cl.⁴ .............................................. H01H 3/16
[52] U.S. Cl. .................................. 200/47; 200/61.41; 340/686
[58] Field of Search .............. 200/47, 61.41, 61.45 R, 200/61.45 M, 61.19, 61.48, 61.51, 276; 73/660; 198/502.1, 857; 361/331, 332, 425, 429; 340/61, 686, 689

[56] References Cited

U.S. PATENT DOCUMENTS

| 3,207,870 | 9/1965 | Herrera | 200/61.41 |
| 3,323,334 | 6/1967 | Richards | 200/61.41 |
| 3,325,611 | 6/1967 | Gourley | 200/61.41 |
| 4,356,362 | 10/1982 | Schmall | 200/61.41 |

FOREIGN PATENT DOCUMENTS 3514444 10/1986 Fed. Rep. of Germany.
3526633 2/1987 Fed. Rep. of Germany.

Primary Examiner—G. P. Tolin
Attorney, Agent, or Firm—Scully, Scott, Murphy & Presser

[57] ABSTRACT

A protective device for a feed unit, especially for a spindle sleeve of a measuring machine, whereby the feed unit is surrounded by a jacket constituted of a multiplicity of springs, which touch the feed unit in the event of a collision and thereby produce electrical contacts, and in which the lower or bottom part of the feed unit is enclosed by a protective shield. The protective shield is constituted of individual screen parts which are displaceable or swingable out of their inoperative position, and which collectively enclose the lower part, wherein the screen parts are maintained in their inoperative position by means of magnets, and in which the screen parts in their tilted position touch at least one spring and thereby become electrically contactive.

8 Claims, 2 Drawing Sheets

PROTECTIVE DEVICE FOR A FEED UNIT

BACKGROUND OF THE INVENTION

1. Field of the Invention

The present invention relates to a protective device for a feed unit, especially for a spindle sleeve of a measuring machine, whereby the feed unit is surrounded by a jacket constituted of a multiplicity of springs, which touch the feed unit in the event of a collision and thereby produce electrical contacts, and in which the lower or bottom part of the feed unit is enclosed by a protective shield.

2. Discussion of the Prior Art

A protective unit of that type is described in the disclosure of earlier German Pat. No. P 35 26 633.3, commonly assigned to the assignee of this application. In that instance, the protective shield is of a unitary construction. During a collision, the protection shield reacts comparatively sluggishly.

In the disclosure of German Laid-Open Pat. No. 35 14 444 there is described a protective device in which the spindle sleeve is encompassed by a protective jacket. This jacket is formed by an electrically-conductive mechanical body or by a multiplicity of light barriers. A mounting device for light transmitters which is arranged at the lower or bottom portion of the spindle sleeve, is itself not integrated into the protective jacket.

SUMMARY OF THE INVENTION

Accordingly, it is an object of the present invention to provide a protective device of the above-mentioned type, which affords a rapid response of the protective shield to a collision.

Inventively, the foregoing object is achieved through a protective device of the above-mentioned type, in that the protective shield is constituted of individual screen parts which are displaceable or swingable out of their inoperative position, and which collectively enclose the lower part, wherein the screen parts are maintained in their inoperative position by means of magnets, and in which the screen parts in their tilted position touch at least one spring and thereby become electrically contactive.

Such a protective device can be employed for especially for the spindle sleeve of a coordinate-measuring machine which is displaceable in a program-controlled manner at a high speed of displacement; for example, at 70 mm/sec. to 100 mm/sec.

When one of the screen parts collides with a body, the screen portion will then swing or pivot over, whereby it will contact one of the springs. The resultant electrical contact between the screen part and the spring is then evaluated for the immediate stopping of the spindle sleeve. Concurrently, there can be carried out the emission of an acoustic or optical signal. Upon a collision, not all of the screen portions, but as a rule, only a single screen part is swung over. Consequently, there is no need for movement of the entire protective shield.

During collisions encountered above the lower or bottom part, one or more of the springs is pressed against the spindle sleeve. Due to this electrical contact there is also effected a stopping of the spindle sleeve.

However, it is also expedient that the screen parts do not require their own electrical devices for the detection of their swinging over. For effecting the switching, in all instances of collision there is evaluated the contact between the springs and the spindle sleeve or, respectively, the screen part.

In a preferred embodiment of the invention, the one ends of each of the springs are suspended electrically-insulated on the screen parts in such a manner as to produce the tendency to swing the screen parts from the outwardly swung position back into the inoperative position. Achieved thereby, on the one hand, is a simpler construction and, on the other hand, a gapless protection of the spindle sleeve.

BRIEF DESCRIPTION OF THE DRAWINGS

Further advantageous features of the invention may now be readily ascertained from tee following detailed description of an exemplary embodiment of the invention, taken in conjunction with the accompanying drawings; in which.

DETAILED DESCRIPTION

Figure 1:
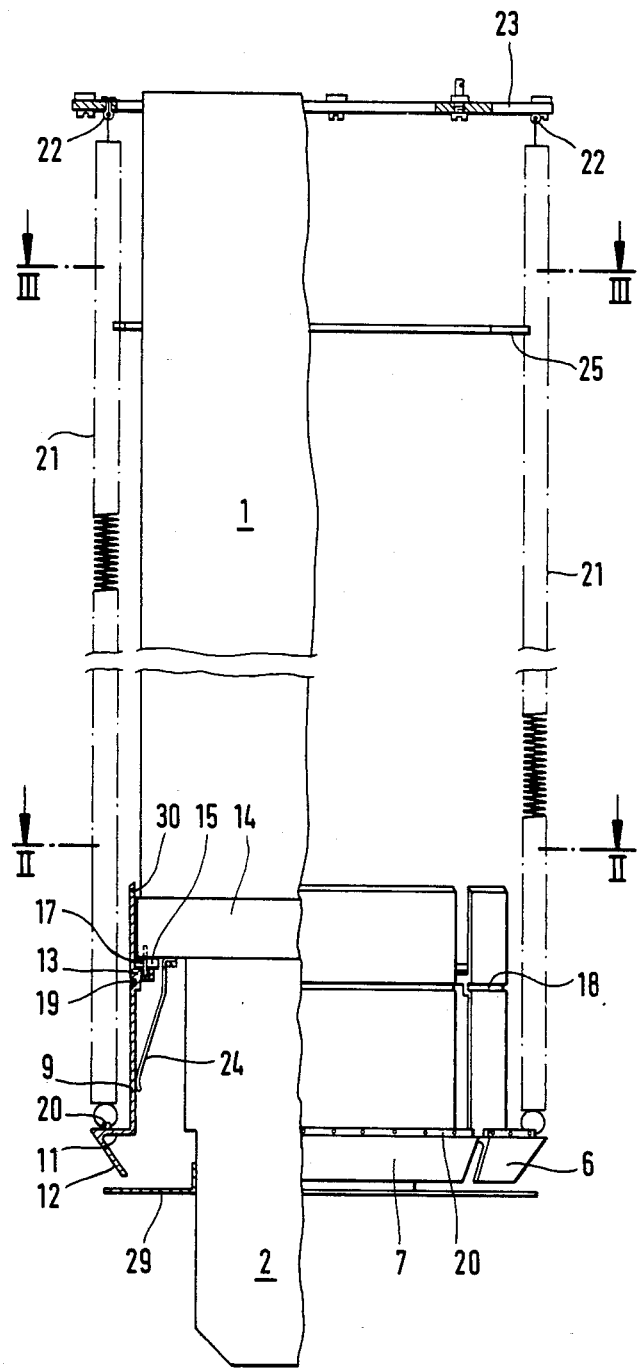
FIG. 1 illustrates, in a partially-sectional longitudinal view, the spindle sleeve of a coordinate measuring machine.

A rectangular or square spindle sleeve 1 of a coordinate-measuring machine includes a lower or bottom portion 2, having a measuring feeler or sensor (not shown) arranged thereon.

On the bottom portion 2 there are arranged screen parts 3 through 10. The screen parts 3, 5, 7 and 9 extend in front of the side surfaces of the bottom portion 2. The screen parts 4, 6, 8 and 10 stand in front of the corner regions of the bottom portion 2. Thereby, the screen parts 3 through 10 collectively enclose the bottom portion 2.

The screen parts 3 through 10 are metallic flat surface components which, at their bottom, possess an outwardly directed bent portion 11 and an inclined surface 12. Formed on the inside of each of the respective screen parts 3 thruugh 10 is an abutment 13.

Figure 2:
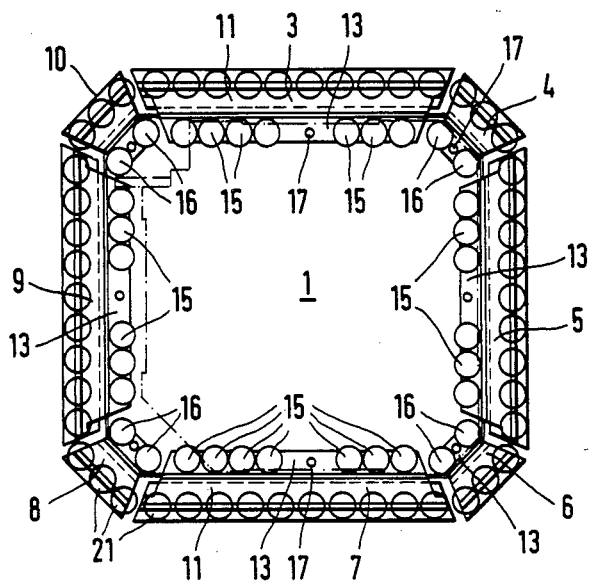
FIG. 2 illustrates a sectional view taken along line II—II in FIG. 1.
Figure 3:
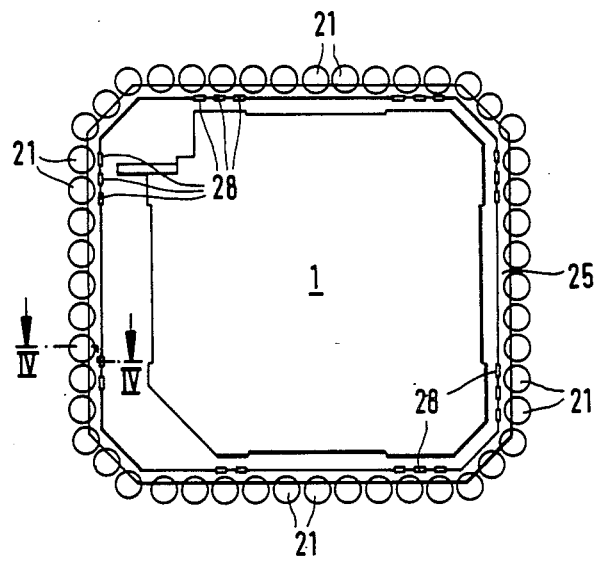
FIG. 3 illustrates a sectional view taken along line III—III in FIG. 1.

The bottom portion 2 possesses a flange 14, as shown in FIG. 1, which is not illustrated in FIGS. 2 and 3. Fastened to the flange 14, for the screen parts 3, 5, 7 and 9, are presently a series of permanent magnets 15, and for the screen parts 4, 6, 8 and 10, presently two permanent magnets 16; for example, by being adhesively fastened or glued thereto. The permanent magnets 15, 16 attract the abutments 13.

A guide pin 17 is arranged on the abutment 13 of each screen part 3 through 10 or on the flange 14. This guide pin possesses a predetermined breaking point, or, is seated in a bore in the flange 14 or, respectively, the abutment 13, which is so dimensioned that the screen part 3 through 10 can be swung or pivoted.

A groove 18 is formed on the outside of the screen parts 3 through 10. Inserted into the grove 18 is a tension spring 19 which extends about all of the screen parts 3 through 10, and which provides for the maintaining together of the screen parts 3 through 10 in their inoperative or rest position.

Fastened to the bent portion of the screen parts 3 through 10 is an electrically insulating bar 20. Tension springs 21 are hinged to this bar. The tension springs 21 are arranged about the entire circumference of the spindle sleeve 1. Provided therebetween is only a narrow space, such that also thin workpieces will contact the tension springs 21 during a collision.

At their upper ends, the tension springs 21 are fastened by means of split pins 22 to a plate 23, the latter of which is arranged on the measuring machine electrically insulated to regard to the spindle sleeve 1.

The tension springs 21 have the tendency to draw the screen parts 3 through 10 from their pivoted position into the inoperative position. In order to support the return setting of the screen parts 3 through 10, there are provided leaf springs 24.

The tension springs 19 are extremely pliant. Especially when the spindle sleeve 1 evidences a lift or displacement which is greater than 60 cm, they can begin to vacillate during regular displacement operation of the spindle shaft 1, and to thereby touch the spindle sleeve 1. This would then lead, in this instance to an undesirable, stopping of the spindle sleeve 1. In order to prevent occurrence of the foregoing, the springs 21 are retained between the bottom portion 2 and the plate 23 on a ring 25 extending about the spindle sleeve 1. For a particularly lengthy axial displacement for the spindle sleeve, there are provided two or more rings 25.

Figure 4:
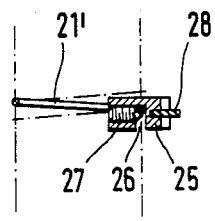
FIG. 4 illustrates, on an enlarged scale, a fragmentary sectional view taken along line IV—IV in FIG. 3.

A recess 26 is provided on the ring 25, into which there is inserted a piece of a winding 21' of the springs 21, and is retained by means of a threaded pin 27, as shown in FIG. 4. Arranged on the side of the ring 25 facing towards the spindle sleeve 1 are a plurality of rubber tongues 28 which, during oscillations of the springs 21, will inhibit an electrically-conductive contact between the ring 25 and the spindle sleeve 1.

Arranged on the bottom part 2 is a protective or guard 29. This ring prevents small workpieces from entering between the spindle sleeve 1 and the screen parts 3 through 10.

The manner of operation of the described arrangement is substantially as follows:

During a regular displacement or traveling operation of the spindle sleeve 1, there is no electrical contact between the tension springs 21 and the spindle sleeve 1, as well as with the screen parts 3 through 10. The screen parts 3 through 10 are retained in their inoperative position by the permanent magnets 15 and 16. Upon a collision with a work-piece in the region of the bottom portion 2, the colliding screen part 3 through 10 swings over in opposition to the force of the leaf spring 24, as a result of which it releases itself from the permanent magnets 15 or 16. As a result thereof, the free end 30 of the applicable screen part 3 through 10 touches the nearby tension spring 21. This electrical contact is utilized for initiating the stopping the operation of the spindle sleeve.

At a collision above the bottom part 2, the work piece presses the tension springs 21 against the spindle sleeve 1. Through this electrical contact there is stopped the operation of the spindle sleeve.

When the collision is encountered in the region of the ring 25, then the rubber tongues 28 can tilt over, and the ring 25 can provide the electrical contact between the springs 21 and the spindle sleeve 1.

After the elimination of the collision, the leaf spring 24 presses back the possibly swung over screen part 3 through 10, such that the free end 30 again contacts against the flange 14, and the screen part 3 through 10 is retained by the magnets 15 or 16.

What is claimed is:

1. A protective device with a feed unit, said feed unit using a spindle sleeve of a measuring machine, said feed unit being encompassed by a jacket constituted of a multiplicity of springs which touch the feed unit during a collision and thereby form electrical contacts of a switch, and the bottom portion of the feed unit being encompassed by a protective shield; the improvement comprising: said protective shield is constituted of individual screen parts which are tiltable from an inoperative position, said screen parts collectively encompassing the bottom portion, and magnets temporarily retaining said screen parts in their operative position, and said screen parts in their tilted position contacting at least one of the springs and resultingly forming electrical contacts.

2. A protective device as claimed in claim 1, wherein one end of each of the springs is hinged and electrically-insulatedly attached screen parts so as to have a tendency to return the screen parts from the tilted position into the inoperative position.

3. A protective device as claimed in claim 1, wherein said screen parts include an abutment which is seated on said magnets which are fastened to a flange on the bottom portion of the feed unit.

4. A protective device as claimed in claim 3, wherein a guide pin is arranged between the abutment and the flange.

5. A protective device as claimed in claim 3, wherein the screen parts have a free end contacting said flange on the bottom portion in the inoperative position and contact at least one spring during the tilting of the screen parts.

6. A protective device as claimed in claim 1, wherein the springs are held together by a ring having electrically-insulating elastic tongues on the side thereof facing towards the spindle sleeve.

7. A protective device as claimed in claim 1, wherein leaf springs provided for the setting back of the screen parts and said leaf springs bearing on the screen parts.

8. A protective device as claimed in claim 1, wherein the screen parts are clamped by a common tension spring.

* * * * *

UNITED STATES PATENT AND TRADEMARK OFFICE
CERTIFICATE OF CORRECTION

PATENT NO. : 4,794,212
DATED : December 27, 1988
INVENTOR(S) : Gerhard Band, et al.

It is certified that error appears in the above-identified patent and that said Letters Patent is hereby corrected as shown below:

Column 2, line 14: "tee" should read as --the--

Column 4, line 31: after "attached" insert --to the--

Signed and Sealed this

Seventeenth Day of October, 1989

Attest:

DONALD J. QUIGG

Attesting Officer      Commissioner of Patents and Trademarks